Dec. 30, 1958　　　W. R. GREEN　　　2,866,440

WRITING INSTRUMENT GUIDE

Filed April 14, 1955

INVENTOR
WILLIAM. R. GREEN.

BY

Pearson + Pearson
ATTORNEYS

United States Patent Office 2,866,440
Patented Dec. 30, 1958

2,866,440

WRITING INSTRUMENT GUIDE

William R. Green, Rochester, N. H.

Application April 14, 1955, Serial No. 501,338

2 Claims. (Cl. 120—102)

This invention relates to devices for teaching proper writing by aiding the hand to assume and remain in correct writing position.

It has heretofore been proposed for this purpose to provide finger guides of strip or rod metal supported on the writing surface and confining the fingers to a predetermined position relative to each other and to the wrist. It has also been proposed to provide combined finger guides and writing instrument guides and devices which are mainly writing instrument guides supported from a wrist band on the operator but having the support under the palm to partially control the position of the hand. A disadvantage of such devices is that they tend to be uncomfortable as well as to cramp the fingers and hand and also tend to make the learner not only depend too much on them, but to be unable to write without them.

Another proposed writing guide for the purpose is typified in U. S. Patent 1,797,103 to Rustad of March 17, 1931 and U. S. Patent 2,501,552 to Thompson of March 21, 1950. Such devices are also of strip or rod metal and support the writing instrument by means of a member extending forwardly from the top of a wrist band. My device is of this type but improves thereover in that it permits greater freedom for the hand to turn sidewise or to flex forwardly and rearwardly relative to the wrist while still urging the writing instrument into the proper angle relative to the writing surface.

The object of the invention is to provide a low cost writing guide such as may be easily secured by children learning to write and such as will teach good writing habits without becoming a necessity or a painful experience to the scholar.

Another object of the invention is to provide a writing guide which urges the writing instrument into an angle of about forty-five degrees to the writing surface at all times while permitting the operator to assume a comfortable hand and finger position and to occasionally change such position as desired.

A further object of the invention is to provide an expandable and contractable writing guide which preferably constantly urges the tip of the writing instrument forwardly and upwardly thus causing the operator to pull downwardly and rearwardly on the instrument and thus retain a predetermined instrument angle.

Still another object of the invention is to provide a writing guide for a writing instrument which not only permits the hand to flex forwardly and rearwardly relative to the wrist but also permits the hand to turn sidewise relative to the wrist thereby reducing any feeling of uncomfortable confinement of the hand on the part of the operator.

Other objects and advantages of the device will be apparent from the claims, the following description of the drawing and from the drawing in which Fig. 1 is a plan view showing the invention in use.

Figure 1:
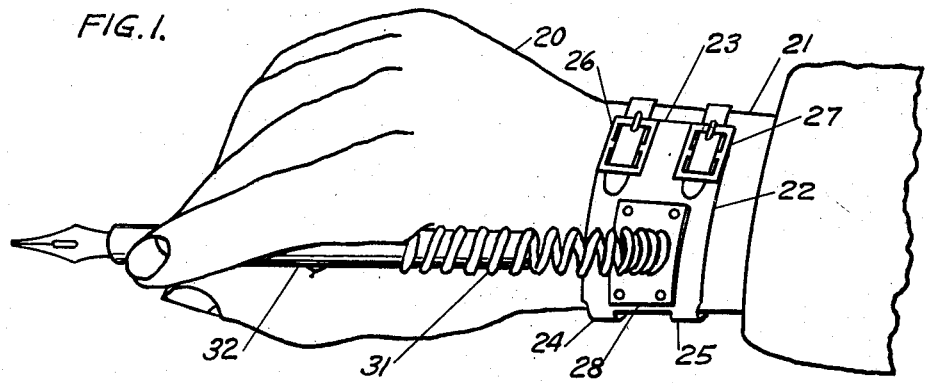
Figure 2:
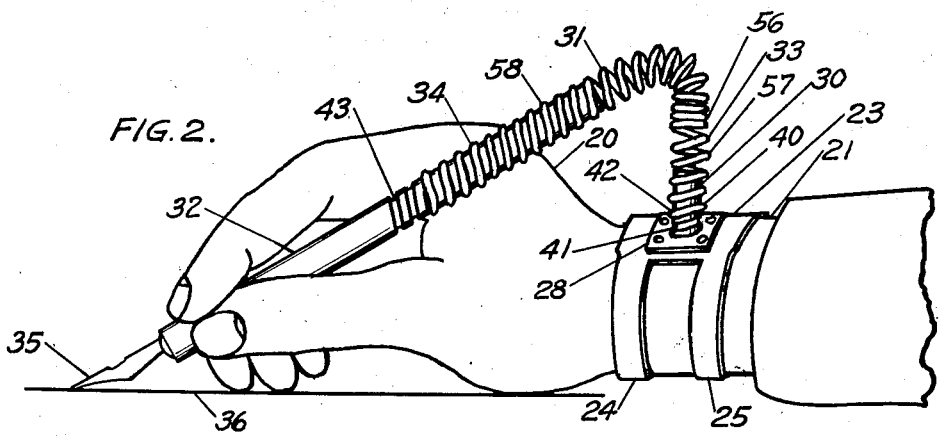
Fig. 2 is a side view of the device shown in Fig. 1.

A preferred embodiment of the invention is shown in Figs. 1 and 2 wherein an operator's hand is designated 20 and the operator's wrist is designated 21.

A wrist band 22, which may be of any suitable material includes an upper portion 23 of substantial width and a pair of parallel straps 24 and 25. A pair of buckles 26 and 27 are provided to detachably secure the straps of wrist band 22 in encircling position around an operator's wrist 21. A flat plate 28, of rigid material such as metal is fixed to the upper portion 23 of band 22 by rivets, staples or the like and arranged to be on top of the wrist when the band is in place.

The plate 28 forms the base for an upstanding post 30 of rigid material whereby the post 30 is permanently mounted on the upper portion of the wrist band and extends vertically thereabove.

A forwardly extending, elongated coil spring 31 is provided for connecting the post 30 with a writing instrument such as the pen 32. The rearward extremity 33 of spring 31 is mounted on and turnable around the post 30 and the forward extremity 34 of spring 31 is arranged to receive and hold the rear portion of the pen 32. Coil spring 31 is of sufficient length to extend forwardly and upwardly from post 30 and then forwardly and downwardly to pen 32 in a bowed formation as shown in Fig. 2. The coil spring 31 is normally straight and in projection of post 30 whereby it must be bent into the bow shown and continually urges the tip 35 of pen 32 both forwardly and upwardly.

The coil spring 31 is open wound, inherently resilient, and expandable and contractable along its longitudinal axis so that an operator may relax or tighten his fingers within a limited range with a consequent slight flexing of the spring. Because of the turnable connection of spring 31 on post 30, the hand 20 may be turned sidewise relative to the wrist with the tip 35 describing an arc in a horizontal plane around the vertical axis of post 30 as a centre. The inherent resilience of spring 31, however, urges it to resume its normal straight position if the spring is flexed out of its normal plane, so that the hand is gently guided back to the initial and correct position shown in Fig. 1. It should be noted that spring 31 cooperates with the hand of the operator to establish and maintain an angle of about forty-five degrees for the pen 32 relative to the writing surface 36. When not in use, the pen 32 may be withdrawn from the spring 31 and the spring 31 withdrawn from post 30, thus permitting the parts to be packed or shipped in a compact package or carried on the person without noticeable bulk.

Figure 3:
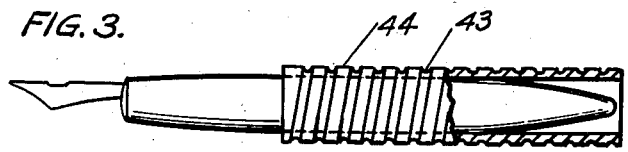
Fig. 3 is an enlarged side elevation partly broken away showing means for adjustably attaching a writing instrument to the coil spring of the invention.

Preferably the post 30 is threaded exteriorly at 40 to threadedly receive the turns of the rearward extremity 33 of spring 31. A space 41 is left between the terminus 42 of the spring coil and the plate 28, or upper portion 23, of band 22, to permit slight free turning of the spring around the axis of the post in either angular direction. Preferably, also, the writing instrument, such as pen 32, is threaded exteriorly at 43 to threadedly receive the turns of the forward extremity 34 of coil spring 31. The threads 43 may be integral with the rear portion of the writing instrument or a threaded ferrule such as shown at 44 may be attachable on a writing instrument in any convenient manner as shown in Fig. 3, the threads 43 are elongated in order that the coil spring may be threaded thereon for any desired distance to suit the size of the writer's hand and wrist. In addition the further within the spring the pen is threaded, the more control is achieved by the spring by reason of the shortening of the span of flexibility thereof. The threaded connection further assures that the writing instrument will not fly off when released by the fingers.

Figure 4:
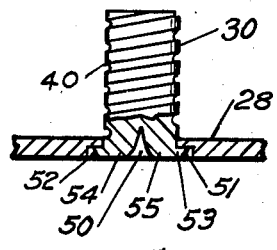
Fig. 4 is an enlarged side elevation, partly broken away showing means for turnably fixing the coil spring of the invention to the post of the wrist strap

As shown in Fig. 4 the post 30 is preferably split as at 50 and the plate 28 provided with a countersunk aperture 51. The tips 52 and 53 of the split portions 54 and 55 of post 30 may thus be peened outwardly to be secured in aperture 51 in the manner of a rivet head.

Preferably the coil spring 31 is formed with a central closely wound portion 56 having opposite open wound end portions 57 and 58 which are respectively right hand and left hand wound.

Figure 5:
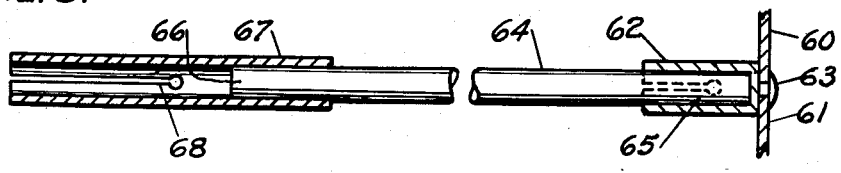
Fig. 5 is an enlarged view of a modified form of resilient member.

A modification of the normally straight, elongated resilient member of the invention is shown in Fig. 5 wherein 60 is the upper portion of a wrist band 61 similar to wrist band 22. A ferrule 62 of rigid material such as metal is turnably mounted on the portion 60 by a headed element 63. Instead of an open wound coil spring a strip 64 of rubber, flexible plastic or the like which may be of round or square cross section is provided. The rearward extremity 65 of strip 64 is secured within ferrule 62 while the forward extremity 66 is secured within a ferrule 67. Ferrule 67 may be split as at 68 to accommodate a writing instrument.

I claim:

1. A device for teaching writing, comprising a writing instrument; a wrist band adapted to encircle the wrist; a post mounted on the upper portion of said wrist band and extending vertically thereabove and a self supporting, elongated coil spring having its rearward extremity encircling said post and its forward extremity encircling and gripping said writing instrument, the forward extremity of said spring being movable laterally and rearwardly relative to said post and said spring being normally straight and thereby adapted, when said forward extremity is flexed downwardly to writing position, to continually urge said forward extremity forwardly and upwardly.

2. A device for teaching writing, said device comprising a writing instrument having an exteriorly threaded rearward portion; a wrist band adapted to encircle the wrist and be detachably secured therearound; a normally straight, self supporting, open wound, coil spring having a forward extremity threaded on the threads of said instrument and having a rearward extremity and rigid, upstanding, connecting means on the upper portion of said wrist band adapted to support and maintain the rearward extremity of said spring in upstanding position thereabove, said coil spring continually urging said writing instrument into an angle of about forty-five degrees when flexed downwardly into bowed conformation in the fingers of an operator.

References Cited in the file of this patent

UNITED STATES PATENTS

| | | |
|---|---|---|
| 1,032,401 | Hager | July 16, 1912 |
| 1,577,272 | Treadaway | Mar. 16, 1926 |
| 2,501,552 | Thompson | Mar. 21, 1950 |
| 2,565,715 | Becker et al. | Aug. 28, 1951 |

FOREIGN PATENTS

| | | |
|---|---|---|
| 970,113 | France | June 7, 1950 |